(12) United States Patent
Wu

(10) Patent No.: US 12,379,087 B2
(45) Date of Patent: Aug. 5, 2025

(54) VEHICLE LAMP DEVICE

(71) Applicant: COPLUS INC., Tainan (TW)

(72) Inventor: Po-Hua Wu, Tainan (TW)

(73) Assignee: COPLUS INC., Tainan (TW)

( * ) Notice: Subject to any disclaimer, the term of this patent is extended or adjusted under 35 U.S.C. 154(b) by 0 days.

(21) Appl. No.: 18/503,092

(22) Filed: Nov. 6, 2023

(65) Prior Publication Data

US 2024/0418335 A1 Dec. 19, 2024

(30) Foreign Application Priority Data

Jun. 15, 2023 (TW) ................................ 112122446

(51) Int. Cl.
*F21S 41/37* (2018.01)
*B60Q 1/00* (2006.01)
(Continued)

(52) U.S. Cl.
CPC ............. *F21S 41/37* (2018.01); *F21S 41/148* (2018.01); *F21S 41/265* (2018.01); *F21S 41/32* (2018.01);
(Continued)

(58) Field of Classification Search
CPC ........ F21S 45/48; F21S 41/147; F21S 41/148; F21S 41/20; F21S 41/25; F21S 41/26; F21S 41/265; F21S 41/27; F21S 41/275; F21S 41/285; F21S 41/29; F21S 41/295; F21S 41/36; F21S 41/43; F21S 41/40; F21S 41/47; F21V 11/14; F21V 11/12; F21V 11/08; G09F 13/0404; G09F 13/0422; G09F 13/0447; G09F 13/14; G09F 2013/142;
(Continued)

(56) References Cited

U.S. PATENT DOCUMENTS

2017/0284620 A1* 10/2017 Arai ...................... F21S 45/47
2023/0417384 A1* 12/2023 Woo ..................... F21S 41/143
(Continued)

FOREIGN PATENT DOCUMENTS

WO WO-2024083936 A1 * 4/2024 ............ F21S 41/265

OTHER PUBLICATIONS

Machine translation of WO 2024083936 A1 retrieved from the FIT database of PE2E search. (Year: 2024).*

*Primary Examiner* — Colin J Cattanach
(74) *Attorney, Agent, or Firm* — Burris Law, PLLC

(57) ABSTRACT

A vehicle lamp device includes an outer frame defining an accommodation space, a light shaping frame, a light-emitting unit, and a light distributing cover. The light shaping frame divides the accommodation space into scattering zones, having first and second light shaping regions spaced apart from each other. The light-emitting unit includes light-emitters aligned with the scattering zones. The light-emitters have first and second light-emitting modules for emitting light towards the first and second light shaping regions. The light distributing cover has lens portions aligned with the scattering zones, and allow illumination of light. Each lens portion has a first lens section that is aligned with the light shaping region of the respective scattering zone, and a second lens section that is aligned with the second light shaping region of the respective scattering zone. The first lens section has a lens curvature different from that of the second lens section.

8 Claims, 8 Drawing Sheets

(51) Int. Cl.
| | |
|---|---|
| *F21S 41/147* | (2018.01) |
| *F21S 41/148* | (2018.01) |
| *F21S 41/20* | (2018.01) |
| *F21S 41/25* | (2018.01) |
| *F21S 41/26* | (2018.01) |
| *F21S 41/265* | (2018.01) |
| *F21S 41/27* | (2018.01) |
| *F21S 41/275* | (2018.01) |
| *F21S 41/29* | (2018.01) |
| *F21S 41/32* | (2018.01) |
| *F21S 41/36* | (2018.01) |
| *F21S 41/43* | (2018.01) |
| *F21S 41/47* | (2018.01) |
| *F21S 45/48* | (2018.01) |
| *F21V 11/08* | (2006.01) |
| *F21V 11/12* | (2006.01) |
| *G09F 13/04* | (2006.01) |
| *G09F 13/14* | (2006.01) |
| *F21S 41/40* | (2018.01) |
| *F21V 11/14* | (2006.01) |

(52) U.S. Cl.
CPC ............ *F21S 41/43* (2018.01); *F21S 45/48* (2018.01); *B60Q 1/0041* (2013.01); *B60Q 1/0047* (2013.01); *B60Q 1/0052* (2013.01); *B60Q 1/0058* (2013.01); *F21S 41/147* (2018.01); *F21S 41/20* (2018.01); *F21S 41/25* (2018.01); *F21S 41/26* (2018.01); *F21S 41/27* (2018.01); *F21S 41/275* (2018.01); *F21S 41/285* (2018.01); *F21S 41/29* (2018.01); *F21S 41/295* (2018.01); *F21S 41/36* (2018.01); *F21S 41/40* (2018.01); *F21S 41/47* (2018.01); *F21V 11/08* (2013.01); *F21V 11/12* (2013.01); *F21V 11/14* (2013.01); *G09F 13/0404* (2013.01); *G09F 13/0422* (2021.05); *G09F 13/0447* (2021.05); *G09F 13/14* (2013.01); *G09F 2013/142* (2013.01); *G09F 2013/145* (2013.01)

(58) Field of Classification Search
CPC ............ G09F 2013/145; B60Q 1/0041; B60Q 1/0047; B60Q 1/0052; B60Q 1/0058
See application file for complete search history.

(56) References Cited

U.S. PATENT DOCUMENTS

| | | | |
|---|---|---|---|
| 2024/0019098 A1* | 1/2024 | Gromfeld | F21S 41/148 |
| 2024/0183508 A1* | 6/2024 | Bae | F21S 41/148 |

* cited by examiner

VEHICLE LAMP DEVICE

CROSS-REFERENCE TO RELATED APPLICATION

This application claims priority to Taiwanese Invention patent application Ser. No. 11/212,2446, filed on Jun. 15, 2023.

FIELD

The disclosure relates to a lamp, and more particularly to a vehicle lamp device.

BACKGROUND

A conventional vehicle lamp device includes a low beam light source, a full beam light source, and a direction indicator light source that are spaced apart from each other and disposed in a lamp housing. The conventional vehicle lamp device further includes a lamp diffuser disposed in front of the lamp housing. When a vehicle using the conventional vehicle lamp device is in a low beam mode, a full beam mode or a direction indicator mode, only portions of the conventional vehicle lamp device near the light sources (the low beam light source, the full beam light source, or the direction indicator light source) are lit, while the remaining portions of the conventional vehicle lamp device stay dark. That is to say that when the conventional vehicle lamp device is in operation, there are brightly lit regions and dark regions on the lamp diffuser, and the conventional vehicle lamp device cannot be uniformly lit. Additionally, the light distribution illuminated by the conventional vehicle lamp device is not variable to meet different user needs.

SUMMARY

Therefore, an object of the disclosure is to provide a vehicle lamp device that can alleviate at least one of the drawbacks of the prior art.

According to the disclosure, the vehicle lamp device includes an outer frame, a light shaping frame, a light-emitting unit, and a light distributing cover. The outer frame defines an accommodation space extending therethrough. The light shaping frame is mounted in the accommodation space, and divides the accommodation space into a plurality of scattering zones that are formed into an arrangement with a predetermined shape. Each of the scattering zones has a first light shaping region and a second light shaping region that are space apart from each other. The light-emitting unit is connected to and covers a rear side of the outer frame, and includes a plurality of light-emitters that are respectively aligned with the scattering zones. Each of the light-emitters has a first light-emitting module for emitting light toward the first light shaping region of the respective one of the scattering zones, and a second light-emitting module for emitting light toward the second light shaping region of the respective one of the scattering zones. The light distributing cover is connected to and covers a front side of the outer frame, and has a plurality of lens portions that are respectively aligned with the scattering zones and that allow illumination of light outwardly. Each of the lens portions has a first lens section that is aligned with the light shaping region of the respective one of the scattering zones, and a second lens section that is aligned with the second light shaping region of the respective one of the scattering zones. The first lens section has a lens curvature that is different from a lens curvature of the second lens section.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
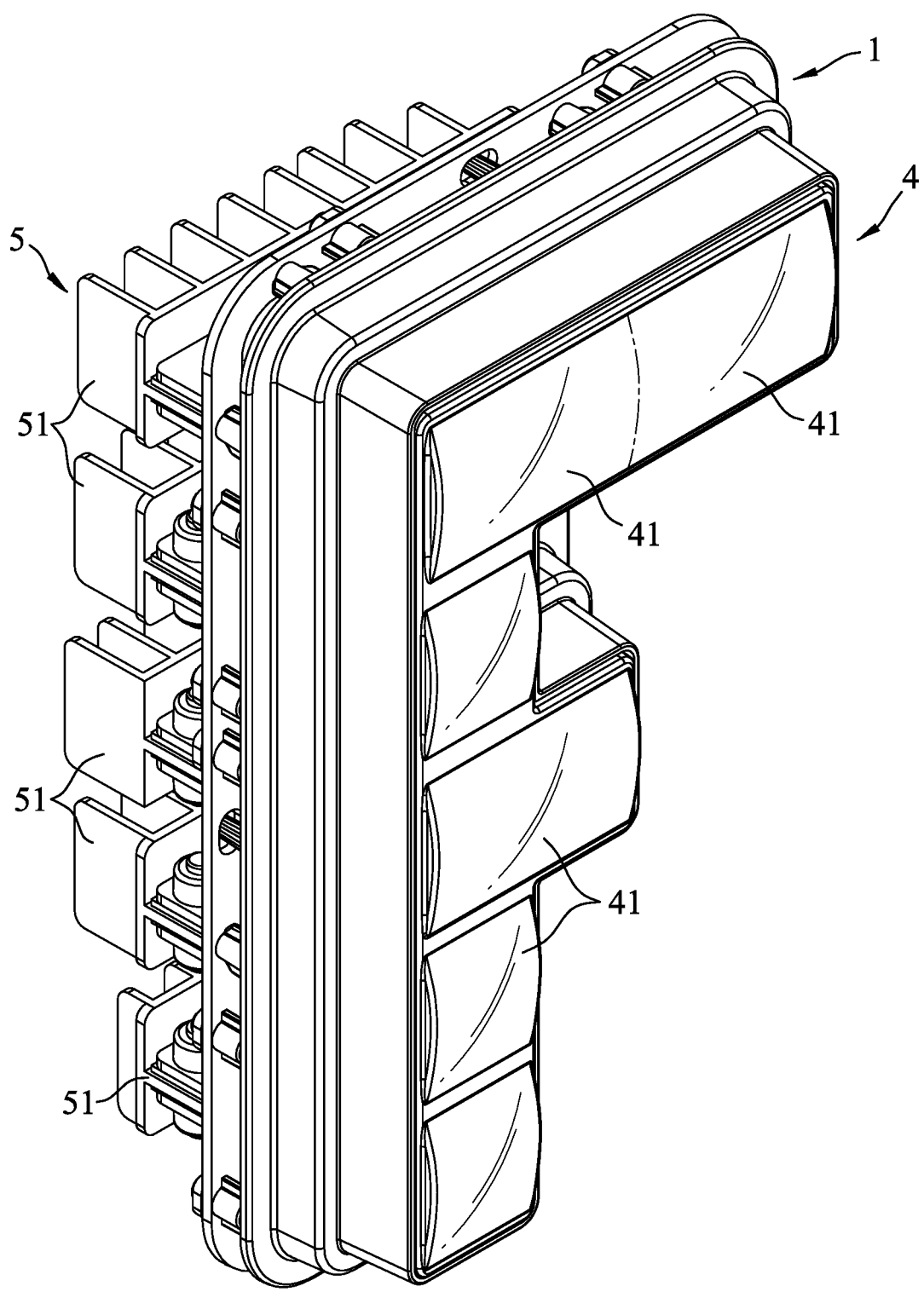
FIG. 1 is a perspective view illustrating an embodiment of a vehicle lamp device according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
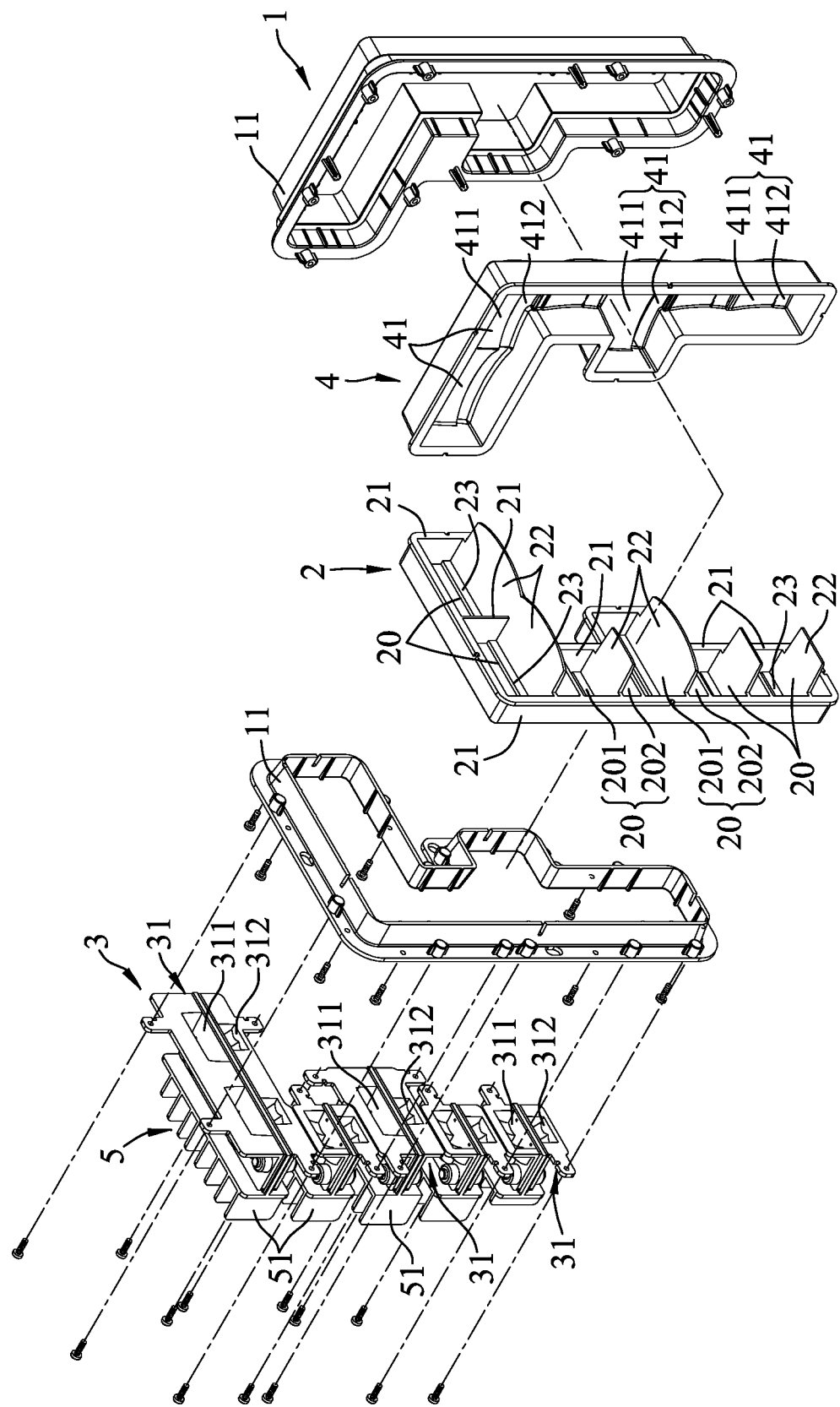
FIG. 2 is an exploded perspective view illustrating the embodiment.

Referring to FIGS. 1 to 2, an embodiment of a vehicle lamp device according to the present disclosure is adapted for mounting on a vehicle (not shown), and can be used as front lighting or tail lighting of the vehicle. When used as vehicle lighting, the vehicle lamp device may be operated to provide illumination in at least two different light distributions, and when used as the front lighting in the vehicle, the vehicle lamp device may emit full beam light distribution or low beam light distribution. However, the vehicle lamp device is not limited to being used as the front lighting of a vehicle. The vehicle lamps device includes an outer frame 1, a light shaping frame 2, a light-emitting unit 3, a light distributing cover 4, and a heat dissipating unit 5.

The outer frame 1 defines an accommodation space 10 (see FIG. 3) extending therethrough. In this embodiment, the outer frame 1 is formed from two frame sections 11 that are L-shaped, and that are connected together along a front-rear direction.

Figure 3:
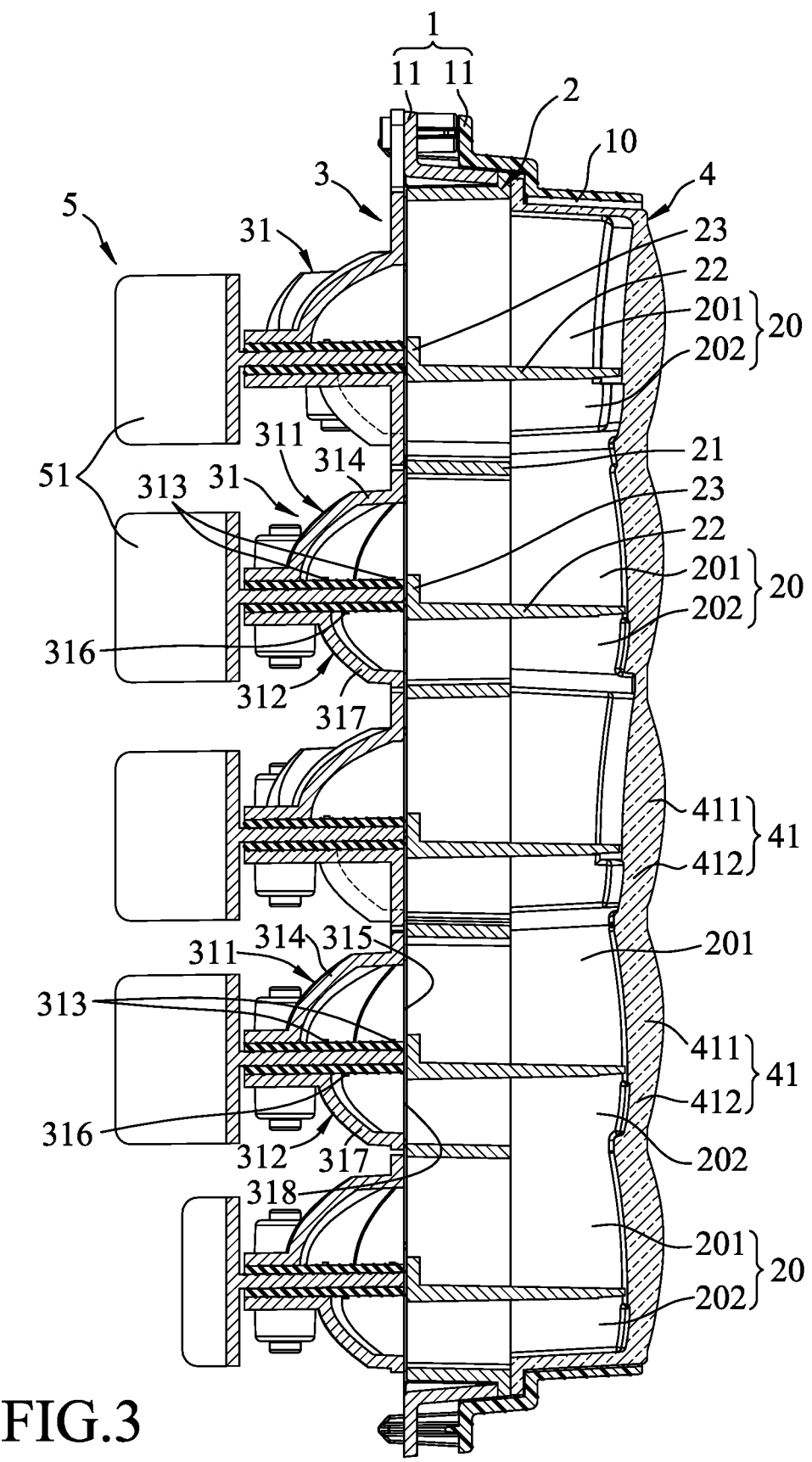
FIG. 3 is a cross-sectional view of the embodiment.
Figure 5:
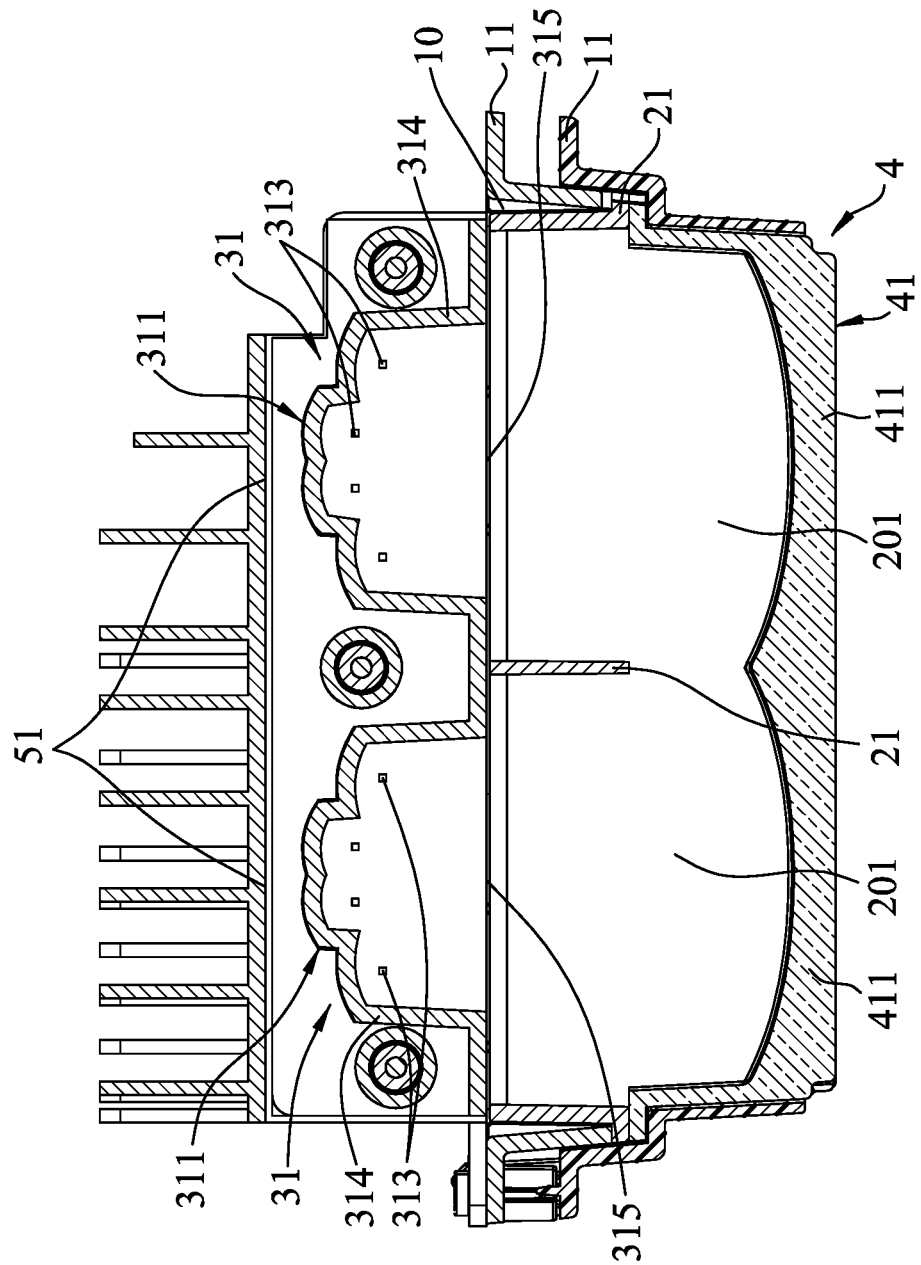
FIG. 5 is a cross-sectional view of the embodiment taken from an angle different from that of FIG. 3.

Referring to FIGS. 2, 3, and 5, the light shaping frame 2 is mounted in the accommodation space 10, and divides the accommodation space 10 into a plurality of scattering zones 20 that are formed into an arrangement with a predetermined shape. Each of the scattering zones 20 has a first light shaping region 201, and a second light shaping regions 202 that are spaced apart from each other. The light shaping frame 2 includes a plurality of frame body portions 21, a plurality of horizontal light-shielding plates 22, and a plurality of vertical light-shielding plates 23. The frame body portions 21 respectively surround the scattering zones 20. The horizontal light-shielding plates 22 are respectively disposed in the frame body portions 21. Each of the horizontal light-shielding plates 22 divides the respective one of the scattering zones 20 into the first light shaping region 201 and the second light shaping region 202. The vertical light-shielding plates 23 respectively protrude from the horizontal light-shielding plates 22. In this embodiment, the light shaping frame 2 is made of an opaque material, and divides the accommodation space 10 into six scattering zones 20. In this embodiment, the light shaping frame 2 includes six frame body portions 21, six horizontal light-shielding plates 22, six vertical light-shielding plates 23, and the six scattering zones 20 are arranged into an F-shape.

Figure 4:
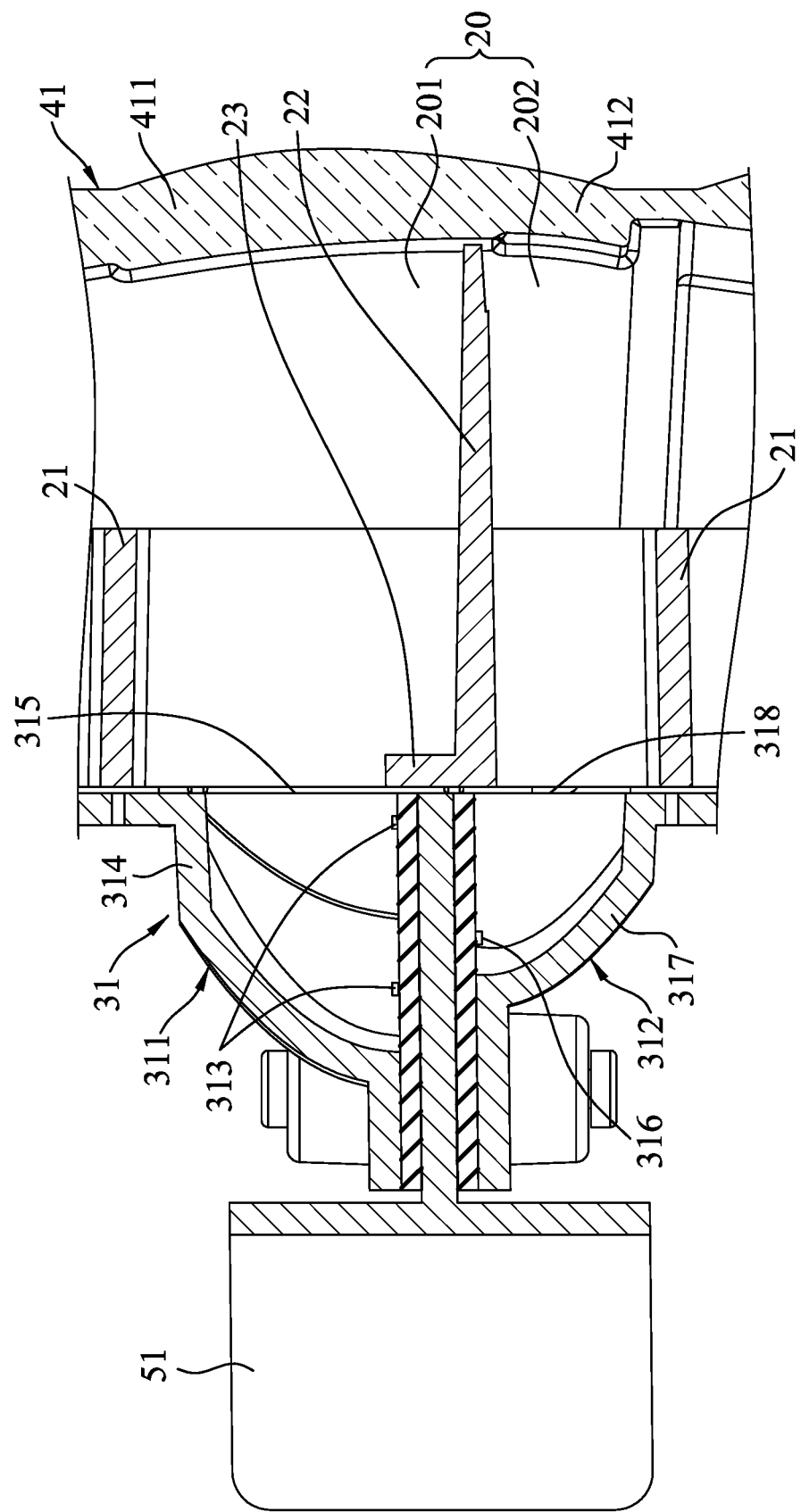
FIG. 4 is an enlarged fragmentary cross-sectional view of FIG. 3 showing the embodiment.

In this embodiment, two of the frame body portions 21 are arranged horizontally adjacent to each other at the top. One of the two of the frame body portions 21 and the remaining four frame body portions 21 are stacked in a single file extending downwardly, and are adjacent to each other in a top-down arrangement. The first light shaping regions 201 of the scattering zones 20 that are surrounded by the two frame body portions 21 at the top are adjacent horizontally and are in spatial communication with each other (see FIG. 5), and the two second light shaping regions 202 of the scattering zones 20 that are surrounded by the two frame body portions 21 at the top are also horizontally adjacent and are in spatial communication with each other. As shown in FIGS. 3 and 4, for the scattering zones 20 surrounded by the frame body portions 21 that are adjacent to each other in the top-down arrangement, the first light shaping region 201 of each of the scattering zones 20 and the second light shaping region 202 of an adjacent one of light scattering zones 20 are in spatial communication with each other. However, in other embodiments, the first light shaping zones 201 of the two horizontally adjacent scattering zones 20 may not be in spatial communication, and the second light shaping zones 202 of the two horizontally adjacent scattering zones 20 may also not be in spatial communication. Additionally, in some embodiments, the second light shaping region 202 and the first light shaping region 201 of the adjacent pair of the light scattering zones 20 in the top-down arrangement may also not be in spatial communication with each other.

Figure 6:
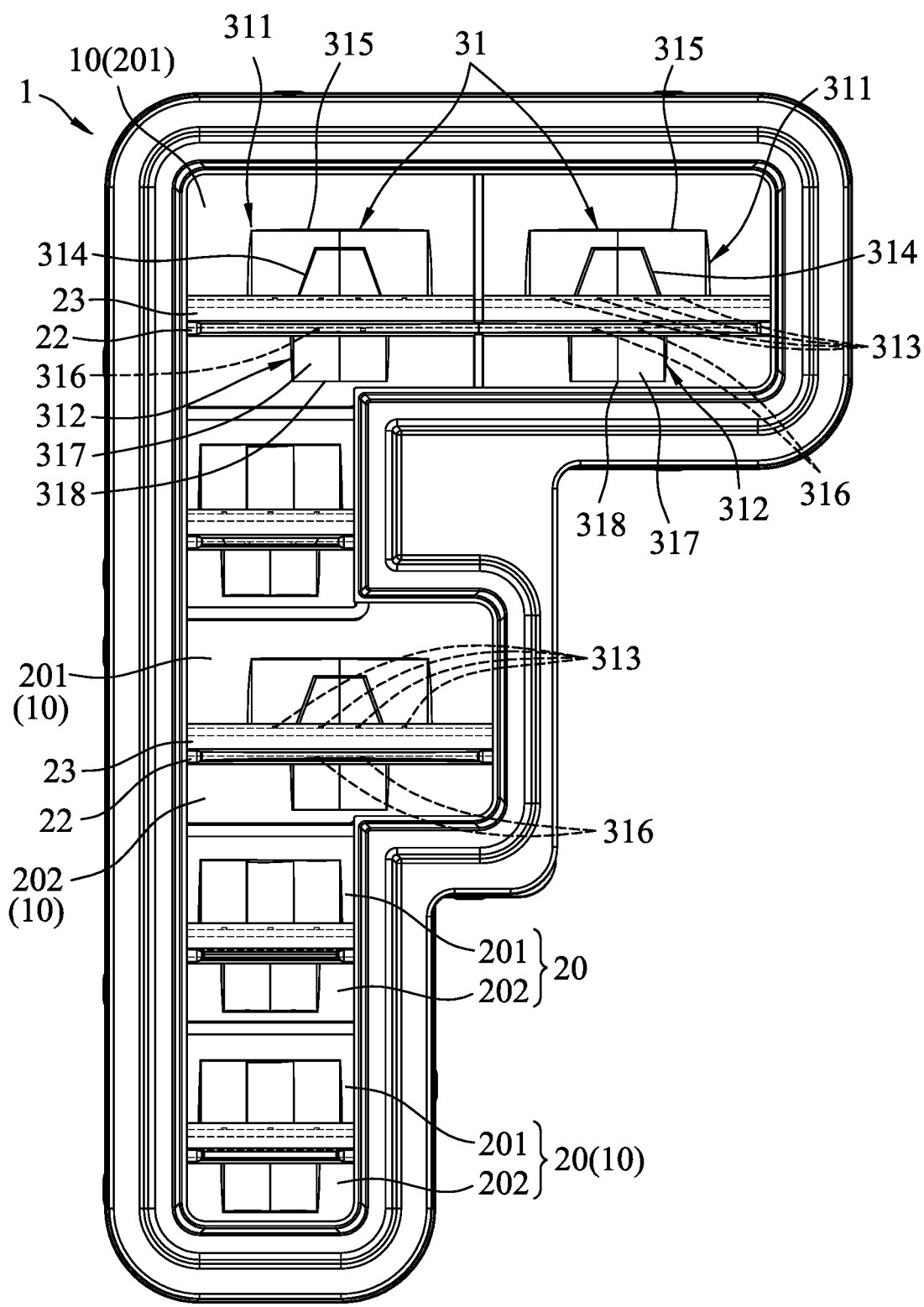
FIG. 6 is a frontal view of the embodiment with a light distributing cover being omitted.
Figure 7:
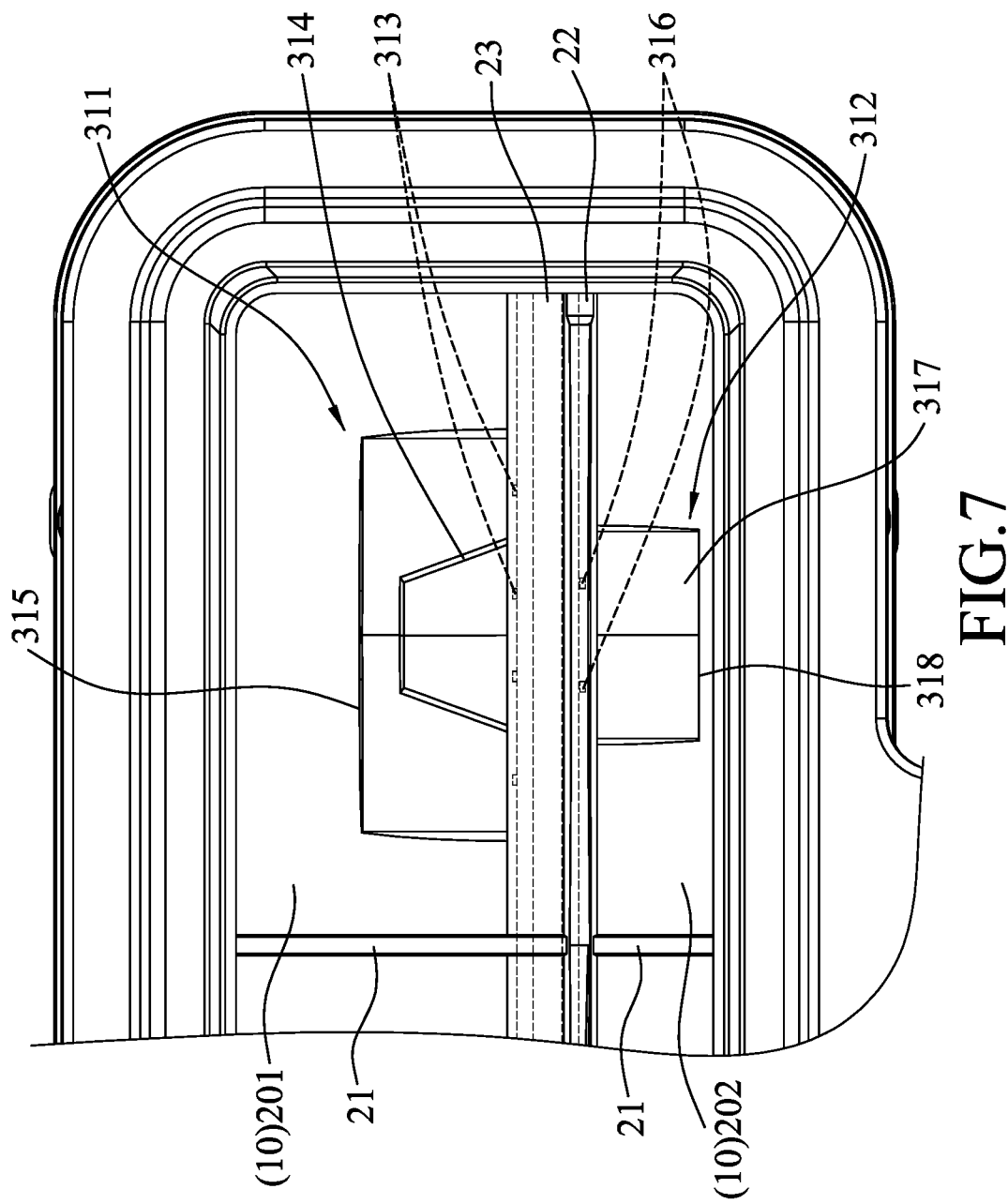
FIG. 7 is a fragmentary enlarged view of FIG. 6 showing the embodiment.

Referring to FIGS. 2, 3, and 6, the light-emitting unit 3 is connected to and covers a rear side of the outer frame 1, and includes a plurality of light-emitters 31 that are respectively aligned with the scattering zones 20. In this embodiment, there are six light-emitters 31. Each of the light-emitters 31 has a first light-emitting module 311 for emitting light toward the first light shaping region 201 of the respective one of the scattering zones 20, and a second light-emitting module 312 for emitting light toward the second light shaping region 202 of the respective one of the scattering zones 20. In this embodiment, the first light-emitting module 311 of each of the light-emitters 31 has a plurality of first light sources 313, and a first reflector 314 that has a forwardly-facing first opening 315, and that is disposed for reflecting light emitted by the first light sources 313 forwardly toward the first light shaping region 201 of the respective one of the scattering zones 20 via the first opening 315. The second light-emitting module 312 of each of the light-emitters 31 has a plurality of second light sources 316, and a second reflector 317 that has a forwardly-facing second opening 318, and that is disposed for reflecting light emitted by the second light sources 316 forwardly toward the second light shaping region 202 of the respective one of the scattering zones 20 via the second opening 318. In this embodiment, the first light sources 313 of each first light-emitting module 311 outnumber the second light sources 316 of each second light-emitting module 312. However, it should be noted that the number of the first and second light sources 313, 316 is not a limitation of the disclosure. In some embodiments, each first light-emitting module 311 may have only a single first light source 313, and each second light-emitting module 312 may have only a single second light source 316.

Referring to FIGS. 2, 3, and 5, the light distributing cover 4 is connected to and covers a front side of the outer frame 1, and has a plurality of lens portions 41 that are respectively aligned with the scattering zones 20 and that allow illumination of light outwardly. Each of the lens portions 41 has a first lens section 411 that is aligned with the first light shaping region 201 of the respective one of the scattering zones 20, and a second lens section 412 that is aligned with the second light shaping region 202 of the respective one of the scattering zones 20. In this embodiment, the light distributing cover 4 has six lens portions 41 that are respectively aligned with the six scattering zones 20.

Figure 8:
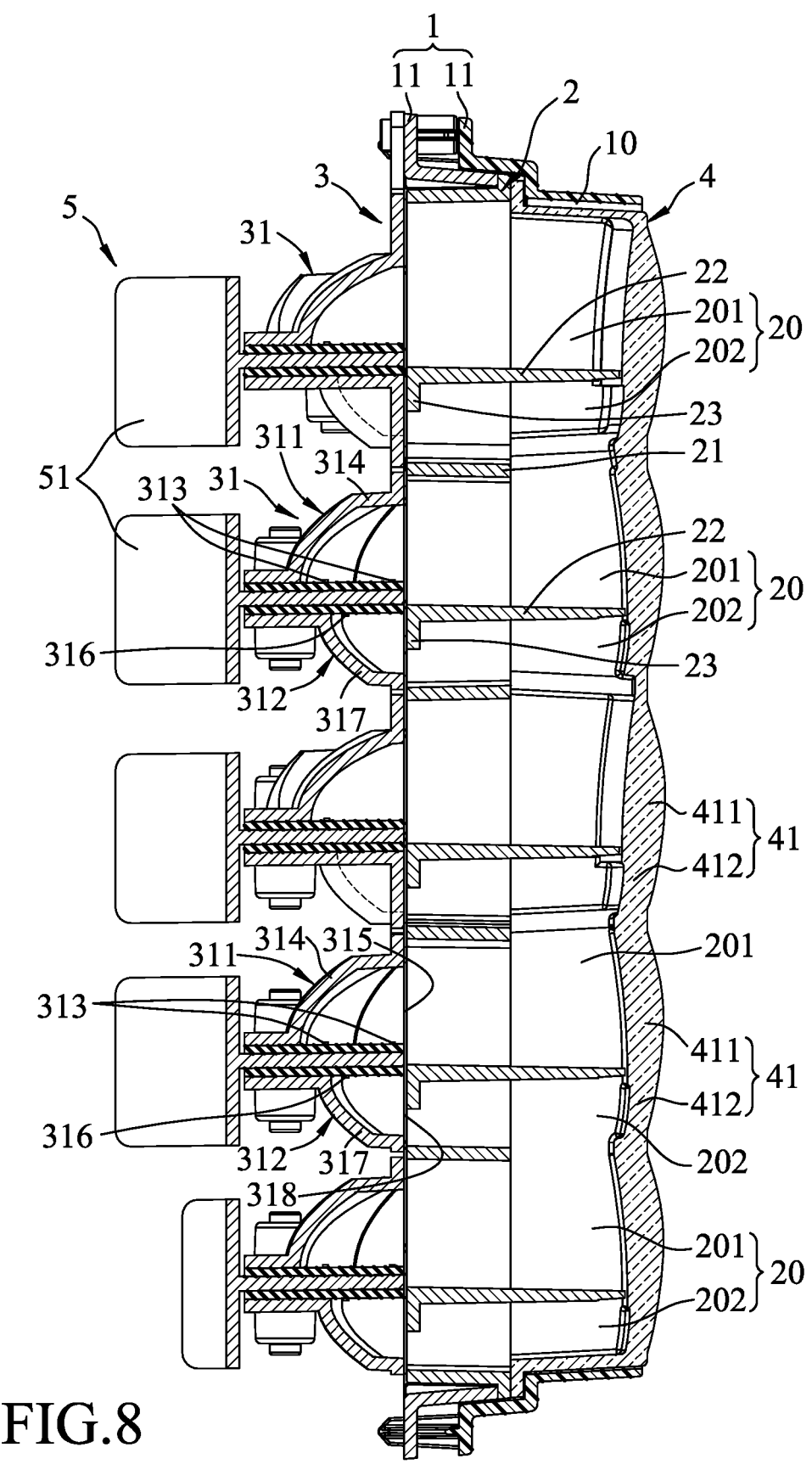
FIG. 8 is a cross-sectional view of another embodiment of the vehicle lamp device according to the present disclosure.

Each of the horizontal light-shielding plates 22 protrudes forwardly out of a front end of the respective one of the frame body portions 21, and abuts against a junction of the first lens section 411 and the second lens section 412 of the respective one of the lens portions 41. The vertical light-shielding plates 23 respectively protrude from the horizontal light-shielding plates 22 into the first light shaping region 201 of the respective one of the scattering zones 20 so as to partially shield the first opening 315 of the respective one of the light-emitters 31 that is aligned with the first light shaping regions 201 from reflected light, thereby ensuring that light illuminating out of the light distributing cover 4 meets regulatory requirements. Referring to FIG. 8, in another embodiment, the vertical light-shielding plates 23 respectively protrude from the light-shielding plates 22 into the second light shaping region 202 of the respective one of the scattering zones 20 so as to partially shield the second openings 318 of the respective one of the light-emitters 31 that is aligned with the second light shaping region 202.

In this embodiment, the first lens sections 411 of the lens portions 41 have different lens curvatures. The second lens sections 412 of the lens portions 41 have different lens curvatures. However, in other embodiments, the first lens sections 411 may have the same lens curvature, and the second lens sections 412 may have the same lens curvature. In some embodiments, the first lens sections 411 may have a lens curvature that is different from a lens curvature of the second lens section 412. In other embodiments, the first lens sections 411 may have different lens curvatures, but with some that are the same, and the second lens sections 412 may have different lens curvatures with some of them the same. The lens curvatures of the first lens sections 411 and the second lens sections 412 should be designed according to the required light distribution to be emitted by the vehicle lamp device, since the shape of light is formed by the combined light emanating from each of the lens portions 41.

The heat dissipating unit 5 is disposed on the light-emitting unit 3, and includes a plurality of heat dissipating portions 51. Each of the heat dissipating portions 51 is disposed between the first light-emitting module 311 and the second light-emitting module 312 of a respective one of the light-emitters 31. Since using the heat dissipating module 5 to dissipate heat from the light-emitting unit 3 is well known in the art, further details are omitted for the sake of brevity.

In this embodiment, the vehicle lamp device is installed as a head lamp of a car, and may be operated to switch between a low beam mode, and a full beam mode. More specifically, the light distributing cover 4 of the vehicle lamp device is designed to modulate light coming from the light-emitting unit 3 of the vehicle lamp device into a low beam light distribution, and a full beam light distribution.

When the vehicle lamp device is switched to the low beam mode, the second light sources 316 of the second light-emitting modules 312 of each of the light-emitters 31 are operated to emit light, and the second reflectors 317 of the second light-emitting modules 312 will reflect light from the second light sources 316 forwardly towards the second light shaping regions 202 of the scattering zones 20.

Because the two second light shaping regions 202 of the two horizontally adjacent scattering zones 20 at the top are in spatial communication, light entering through one of the two second light shaping regions 202 will not only illuminate out of the aligned second lens section 412 but will also diffuse to the other light shaping region 202 and illuminate out of the adjacent second lens section 412. For each adjacent pair of the scattering zones 20 that are in the top-down arrangement, since the second light shaping region 202 of one of the scattering zones 20 and the first light shaping region 201 of the other one of the scattering zones 20 are in spatial communication with each other, light entering the second light shaping region 202 is allowed to not only illuminate out of the aligned second lens section 412 but also diffuse to the first light shaping region 201 that is in spatial communication with the second light shaping region 202 and illuminate out of the first lens section 411 that is aligned with the first light shaping region 201. With the above arrangement, the light distributing cover 4 may be uniformly lit without dark regions and be illuminated with a predetermined F-shape. Additionally, light illuminating out of the light distributing cover 4 will cooperatively form a low beam light distribution.

When the vehicle lamp device is operated to switch to the full beam mode, the first light sources 313 of the first light-emitting modules 311 of each of the light-emitters 31 and the second light sources 316 of the second light-emitting modules 312 of each of the light-emitters 31 are controlled to emit light synchronously. The first reflectors 314 will reflect light emitted by the first light sources 313 forwardly toward the first light shaping regions 201 of the scattering zones 20, and the second reflectors 317 will reflect light emitted by the second light sources 316 forwardly toward the second light shaping regions 202 of the scattering zones 20.

By virtue of the two first light shaping regions 201 of the two horizontally adjacent scattering zones 20 at the top being in spatial communication, and the two second light shaping regions 202 of the two horizontally adjacent scattering zones 20 at the top being in spatial communication, light entering one of the first light shaping regions 201 will not only illuminate out of the aligned first lens section 411, but will also diffused to the other one of the first light shaping regions 201 and illuminate out of the adjacent first lens section 411 that is aligned with the other one of the first light shaping regions 201. Additionally, light entering one of the second light shaping regions 202 will not only illuminate out of the aligned second lens section 412, but will also be diffused into the other one of the second light shaping regions 202 and illuminate out of the adjacent second lens section 412 that is aligned with the other one of the second light shaping region 202. For each adjacent pair of the scattering zones 20 that are in the top-down arrangement, since the second light shaping region 202 of one of the scattering zones 20 and the first light shaping region 201 of the other one of the scattering zones 20 are in spatial communication with each other, light entering the second light shaping region 202 is allowed to not only illuminate out of the aligned second lens section 412 but also diffuse to the first light shaping region 201 that is in spatial communication with the second light shaping region 202 and illuminate out of the first lens section 411 that is aligned with the first light shaping region 201. With the above arrangement, the light distributing cover 4 may be uniformly lit without dark regions and emanate light with a predetermined F-shape. Additionally, light illuminating out of the light distributing cover 4 will cooperatively form a full beam light distribution.

In some embodiments, when switching between the low beam mode and the full beam mode, only one of the first light-emitting module 311 and the second light-emitting module 312 of each light-emitter 31 is operated to emit light which illuminates through the light distributing cover 4 to form the low beam light distribution or the full beam light distribution. Alternatively, only the first light-emitting modules 311 or the second light emitting modules 312 of a portion of the light-emitters 31 may be operated to emit light to form the low beam light distribution, with the second light-emitting modules 312 or the first light-emitting modules 311 of the portion of the light-emitters 31 and the first and second light-emitting modules 311, 312 of the remainder of the light-emitters 31 being operated to emit light to form the full beam light distribution.

In this embodiment, there are six scattering zones 20, six light-emitters 31, and six lens portions 41, that are formed together into an F-shape. However, in other embodiments, the number of scattering zones 20, the light emitters 31, and the lens portions 41 are not limited to six. Additionally, it should be noted that they may be arranged into different shapes, for example, capitalized Latin letters, lower case Latin letters, Korean Hangul, Japanese Katakana or Hiragana, alphanumeric numerals or other special shapes such as a circular shape or a star shape. It should be noted that, the shape formed by the scattering zones 20, the light emitters 31, and the lens portions 41 should be based on user requirements, and the number of scattering zones 20, light emitters 31, and lens portions 41 should be based on the required shape.

In addition, in this embodiment, the first light shaping region 201 and the second light shaping region 202 of each scattering zone 20 are spaced apart from each other in a top-down arrangement. However, this is not a limitation of the disclosure, and the first light shaping region 201 and the second light shaping region 202 should be configured according to the predetermined shape. Alternatively, the first light shaping regions 201 and the second light shaping region 202 of each scattering zone 20 may be spaced apart from each other in a left-right arrangement, or a radially spaced apart arrangement. When adopting any particular arrangement, the first and second light-emitting modules 311, 312 of each of the light-emitting units 31, and the positioning of the first and second lens sections 411, 412 of each of the lens portion 41 should be adjusted accordingly.

In summary of the above, in the vehicle lamp device according to the present disclosure, the first and second light-emitting modules 311, 312 of each of the light-emitters 31 respectively emit light toward the first and second light shaping regions 201, 202 of the respective one of the scattering zones 20. The first lens section 411 is aligned with the first light shaping region 201 of the respective one of the scattering zones 20, and the second lens section 412 is aligned with the second light shaping region 202 of the respective one of the scattering zones 20. The above configuration allows light to emanate from the first and second lens sections 411, 412, and ensures that light illuminates outwardly from the lens portions 41 irrespective of it is only some, or all of the first and second light-emitting modules 311, 312 that are in operation, and allows light from the lens portions 4 to form into a predetermined shape and switch between the low beam distribution and full beam distribution.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A vehicle lamp device comprising:
an outer frame defining an accommodation space extending therethrough;
a light shaping frame mounted in said accommodation space, and dividing said accommodation space into a plurality of scattering zones that are formed into an arrangement with a predetermined shape, each of said scattering zones having a first light shaping region and a second light shaping region that are spaced apart from each other;
a light-emitting unit connected to and covering a rear side of said outer frame, and including a plurality of light-emitters that are respectively aligned with said scattering zones, each of said light-emitters having a first light-emitting module for emitting light toward said first light shaping region of the respective one of said scattering zones, and a second light-emitting module for emitting light toward said second light shaping region of the respective one of said scattering zones; and
a light distributing cover connected to and covering a front side of said outer frame, and having a plurality of lens portions that are respectively aligned with said scattering zones and that allow illumination of light outwardly, each of said lens portions having a first lens section that is aligned with said first light shaping region of the respective one of said scattering zones, and a second lens section that is aligned with said second light shaping region of the respective one of said scattering zones, said first lens section having a lens curvature that is different from a lens curvature of said second lens section;
wherein said light shaping frame includes
a plurality of frame body portions respectively surrounding said scattering zones, and
a plurality of horizontal light-shielding plates respectively disposed in said frame body portions, each of said horizontal light-shielding plates protruding forwardly out of a front end of the respective one of said frame body portions, abutting against a junction of said first lens section and said second lens section of the respective one of said lens portions, and dividing the respective one of said scattering zones into said first light shaping region and said second light shaping region;
wherein said first light-emitting module of each of said light-emitters has a first light source, and a first reflector that has a forwardly-facing first opening, and that is disposed for reflecting light emitted by said first light source forwardly toward said first light shaping region of the respective one of said scattering zones via said first opening;
wherein said second light-emitting module of each of said light-emitters has a second light source, and a second reflector that has a forwardly-facing second opening, and that is disposed for reflecting light emitted by said second light source forwardly toward said second light shaping region of the respective one of said scattering zones via said second opening;
wherein when said vehicle lamp device is in a low beam mode, said second light source of said second light-emitting module of each of said light-emitters is operated to emit light, and said second reflector of said second light-emitting module of each of said light-emitters reflects light from said second light source forwardly towards said second light shaping regions of said scattering zones;
wherein two of said scattering zones are horizontally adjacent and in spatial communication, such that light entering through said second light shaping region of one of said two of said scattering zones illuminates out of said second lens section that is aligned with said second light shaping region of said one of said two of said scattering zones and diffuses to said second light shaping region of another one of said two of said scattering zones;
wherein two of said scattering zones are adjacent in a top-down arrangement, and said second light shaping region of one of said two of said scattering zones is in spatial communication with said first light shaping region of another one of said two of said scattering zones, such that light entering said second light shaping region of said one of said two of said scattering zones illuminates out of said second lens section that is aligned with said second light shaping region of said one of said two of said scattering zones, diffuses to said first light shaping region of said another one of said two of said scattering zones, and illuminates out of said first lens section that is aligned with said first light shaping region of said another one of said two of said scattering zones;

wherein when said vehicle lamp device is in a full beam mode, said first light source of said first light-emitting module of each of said light-emitters and said second light source of said second light-emitting module of each of said light-emitters are controlled to emit light synchronously, said first reflector of said first light-emitting module of each of said light-emitters reflects light emitted by said first light source of said first light-emitting module of each of said light-emitters forwardly toward said first light shaping regions of said scattering zones, and said second reflector of said second light-emitting module of each of said light-emitters reflects light emitted by said second light sources of said second light-emitting module of each of said light-emitters forwardly toward said second light shaping regions of said scattering zones; and wherein said first light shaping region of one of said two of said scattering zones that are horizontally adjacent is in spatial communication with said first light shaping region of another one of said two of said scattering zones, such that light entering said first light shaping region of one of said two of said scattering zones illuminates out of said first lens section that is aligned with said first light shaping region of said one of said two of said scattering zones, diffuses to said first light shaping region of another one of said two of said scattering zones, and illuminates out of said adjacent first lens section that is aligned with said first light shaping region of said another one of said two scattering zones.

2. The vehicle lamp device as claimed in claim 1, wherein said plurality of scattering zones comprises at least a third and fourth scattering zone adjacent to one another; wherein a first light shaping region of said third scattering zone and a second light shaping region of said fourth scattering zone are in spatial communication with each other.

3. The vehicle lamp device as claimed in claim 1, wherein said light shaping frame further includes a plurality of vertical light-shielding plates respectively protruding from said horizontal light-shielding plates into one of said first light shaping region and said second light shaping region of the respective one of said scattering zones so as to partially shield one of said first openings and said second openings of the respective one of said light-emitters that is aligned with said one of said first light shaping region and said second light shaping region.

4. The vehicle lamp device as claimed in claim 1, wherein said first lens sections of said lens portions have different lens curvatures.

5. The vehicle lamp device as claimed in claim 4, wherein second lens sections of said lens portions have different lens curvatures.

6. The vehicle lamp device as claimed in claim 1, wherein said second lens sections of said lens portions have different lens curvatures.

7. The vehicle lamp device as claimed in claim 1, further comprising a heat dissipating unit disposed on said light-emitting unit.

8. The vehicle lamp device as claimed in claim 7, wherein said heat dissipating unit includes a plurality of heat dissipating portions, each of said heat dissipating portions being disposed between said first light-emitting module and said second light-emitting module of a respective one of said light-emitters.

* * * * *